July 7, 1925.

C. R. GILLIS

PISTON RING COMPRESSOR

Filed June 3, 1924

1,544,974

INVENTOR=
Charles R. Gillis
By Geo. K. Woodworth
ATTORNEY=

Patented July 7, 1925.

1,544,974

UNITED STATES PATENT OFFICE.

CHARLES R. GILLIS, OF BOSTON, MASSACHUSETTS, ASSIGNOR TO M. E. CURTIS, OF BOSTON, MASSACHUSETTS.

PISTON-RING COMPRESSOR.

Application filed June 3, 1924. Serial No. 717,524.

*To all whom it may concern:*

Be it known that I, CHARLES R. GILLIS, a citizen of the United States, and a resident of Boston, in the county of Suffolk and State of Massachusetts, have invented a new and useful Improvement in Piston-Ring Compressors, of which the following is a specification.

When the pistons of internal combustion engines are inserted in their cylinders a certain amount of difficulty is encountered in maintaining the piston rings, more especially those of the multi-part non-leakable type, so called, in their respective grooves. It is, of course, essential that the overlapping portions of the several rings be staggered in order to prevent leakage through the gaps between the two ends of each ring and the twisting and turning of the piston during the insertion of the same in the cylinder is liable to disarrange the proper relative positions of the several rings and bring the overlapping portions more or less in alignment.

It is the object of the present invention to provide a device for maintaining the piston rings of the pistons of any type of engine, especially an internal combustion engine, in the piston grooves preparatory to inserting such piston in its cylinder.

With this object in view my invention comprises essentially a circular band of flexible material so arranged that its diameter may be varied to conform to that of the piston, and a plurality of fingers or guide pieces slidably and adjustably connected to the band for compressing the piston rings and holding them in their grooves during the operation of inserting the piston in its cylinder.

In the drawings which accompany and form a part of this specification—

Figure 1:
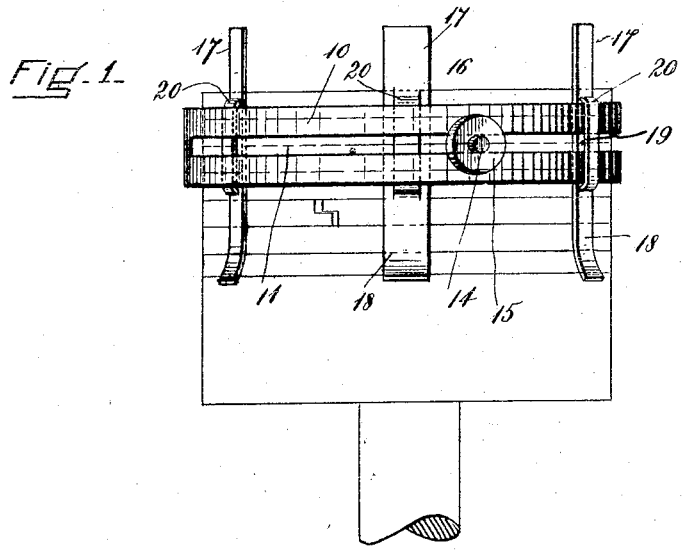
Figure 1 is an elevation of my improved piston ring compressor showing its method of use on a gas engine piston.
Figure 2:
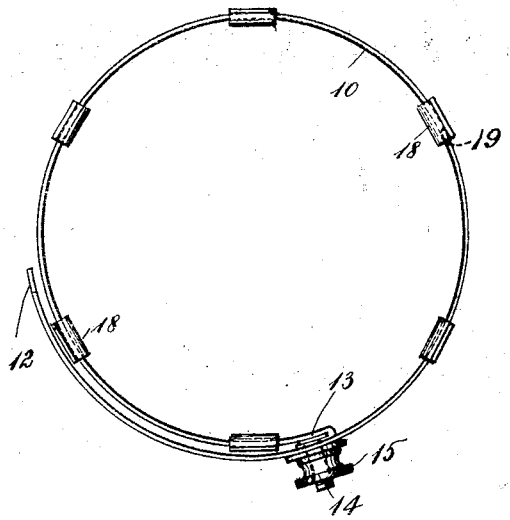
Fig. 2 is a plan view.

In the particular drawings selected for more fully disclosing my invention 10 represents a strip of flexible material, such for example, spring brass, provided with a slot 11 extending about one-third of the length thereof from a point near the end 12. The other end 13 is provided with a screw 14 threaded or soldered or otherwise secured thereto, said screw passing through said slot and being provided with a thumb-screw 15 whereby the end portion 13 may be clamped against the slotted portion of the strip after the circular band has been given the proper diameter by moving said slotted portion with respect to the end 13.

Fingers or guide-pieces 16 herein shown as six in number are adjustablly connected with the circular band formed by the strip 10. Each said finger consists of a straight portion 17 extending from one side of the circular band in parallelism with the axis thereof, and of an outwardly flaring portion 18 extending from the other side of said band. The fingers are slotted as shown at 19 for receiving the band and are in frictional engagement therewith so that, although they may be slid along the same to desired position, they will nevertheless remain in adjusted position during the use of the device.

Figures 3, 4:
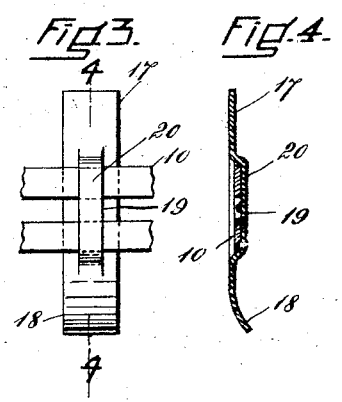
Fig. 3 is a fragmentary elevation.
Fig. 4 is a vertical section taken on the line 4—4 of Fig. 3.

While obviously many arrangements may be employed for adjustably and slidably connecting the fingers with the band, I show in Figs. 3 and 4 one arrangement which has given good results in practice, viz., slots 19 are formed in the fingers intermediate the ends thereof by dieing out the portion 20 of the finger to form a bridge slightly raised from the surface of the finger. The band is then passed through the space or slot 19 between the bridge 20 and the outer surface of the finger.

In the use of my device the band is applied to the ungrooved part of the cylinder with the straight portions 17 of the fingers in contact therewith, the nut 15 loosened and the band contracted until the said straight portions 17 closely fit the piston, whereupon, having adjusted the diameter of the circular band to the piston in connection with which the device is to be used, the nut is tightened. The device is then removed from the ungrooved portion of the piston by passing it down over the piston rod, and is then placed over the head of the piston with the outwardly flaring portions 18 in contact therewith as shown in Fig. 1. The said portions 18 engage the piston rings as the device is passed down over the piston and compress and tightly hold them in their grooves. The band is then passed further along the cylinder until the ends of the straight portions 17 are flush with the top thereof, and this conveniently may be done by grasping the piston rod and striking the head of the piston against a plane surface.

The piston is then inserted in its cylinder and pushed upwardly, each ring being compressed and in the proper position as the grooved part of the piston which carries such ring enters the cylinder. Finally as the lower portion of the piston enters the cylinder, the device slides off and is removed by passing the same over the rod.

Having thus described an illustrative embodiment of my invention without however limiting the same thereto, what I claim and desire to secure by Letters Patent is:—

1. A device for maintaining piston rings in any desired position in the piston grooves preparatory to inserting such piston in a cylinder, comprising a circular band of flexible material, means whereby the diameter of said circular band may be varied, and a plurality of members slidable circumferentially on said band, each said member having a portion extending from one end of said circular band in parallelism with the axis thereof and an outwardly flaring portion extending from the other end of said band.

2. A device for maintaining piston rings in any desired position in the piston grooves preparatory to inserting such piston in a cylinder, comprising a strap of flexible material, said strap being provided with a slot at one end, a screw secured to the other end and passing through said slot, whereby a circular band of adjusted diameter may be formed, and a plurality of guide pieces each provided with a slot for receiving said strap, said guide pieces being in frictional engagement with said strap and slidable along the same.

In testimony whereof, I have hereunto subscribed my name this 31st day of May, 1924.

CHARLES R. GILLIS.